US010732714B2

(12) United States Patent
Rao et al.

(10) Patent No.: US 10,732,714 B2
(45) Date of Patent: Aug. 4, 2020

(54) INTEGRATED HAPTIC SYSTEM

(71) Applicant: Cirrus Logic International Semiconductor Ltd., Edinburgh (GB)

(72) Inventors: Harsha Rao, Austin, TX (US); Rong Hu, Austin, TX (US); Carl Lennart Ståhl, Malmö (SE); Jie Su, Austin, TX (US); Vadim Konradi, Austin, TX (US); Teemu Ramo, Edinburgh (GB); Anthony Stephen Doy, Los Gatos, CA (US)

(73) Assignee: Cirrus Logic, Inc., Austin, TX (US)

( * ) Notice: Subject to any disclaimer, the term of this patent is extended or adjusted under 35 U.S.C. 154(b) by 349 days.

(21) Appl. No.: 15/722,128

(22) Filed: Oct. 2, 2017

(65) Prior Publication Data

US 2018/0321748 A1 Nov. 8, 2018

Related U.S. Application Data

(60) Provisional application No. 62/503,163, filed on May 8, 2017, provisional application No. 62/540,921, filed on Aug. 3, 2017.

(51) Int. Cl.
*G06F 3/01* (2006.01)
*G06F 3/041* (2006.01)
*G06F 3/044* (2006.01)

(52) U.S. Cl.
CPC ............ *G06F 3/016* (2013.01); *G06F 3/01* (2013.01); *G06F 3/044* (2013.01); *G06F 3/0414* (2013.01); *G06F 3/0416* (2013.01)

(58) Field of Classification Search
CPC ........ G06F 3/016; G06F 3/044; G06F 3/0414; G06F 3/0416; G06F 3/01; H04R 1/025
(Continued)

(56) References Cited

U.S. PATENT DOCUMENTS

| 4,902,136 A | 2/1990 | Mueller et al. |
| 5,684,722 A | 11/1997 | Thorner et al. |

(Continued)

FOREIGN PATENT DOCUMENTS

| AU | 2002347829 | 4/2003 |
| CN | 103165328 A | 6/2013 |

(Continued)

OTHER PUBLICATIONS

Communication Relating to the Results of the Partial International Search, and Provisional Opinion Accompanying the Partial Search Result, of the International Searching Authority, International Application No. PCT/US2018/031329, dated Jul. 20, 2018.
(Continued)

*Primary Examiner* — John A Tweel, Jr.
(74) *Attorney, Agent, or Firm* — Jackson Walker L.L.P.

(57) ABSTRACT

An integrated haptic system may include a digital signal processor and an amplifier communicatively coupled to the digital signal processor and integrated with the digital signal processor into the integrated haptic system. The digital signal processor may be configured to receive a force sensor signal indicative of a force applied to a force sensor and generate a haptic playback signal responsive to the force. The amplifier may be configured to amplify the haptic playback signal and drive a vibrational actuator communicatively coupled to the amplifier with the haptic playback signal as amplified by the amplifier.

57 Claims, 7 Drawing Sheets

(58) Field of Classification Search
USPC .................................................. 340/407.1
See application file for complete search history.

(56) References Cited

U.S. PATENT DOCUMENTS

| | | | |
|---|---|---|---|
| 5,857,986 A | 1/1999 | Moriyasu | |
| 6,050,393 A | 4/2000 | Murai et al. | |
| 6,278,790 B1 | 8/2001 | Davis et al. | |
| 6,332,029 B1 | 12/2001 | Azima et al. | |
| 6,388,520 B2 * | 5/2002 | Wada | H03F 1/301 |
| | | | 330/253 |
| 6,683,437 B2 | 1/2004 | Tierling | |
| 6,703,550 B2 | 3/2004 | Chu | |
| 6,762,745 B1 | 7/2004 | Braun et al. | |
| 6,906,697 B2 | 6/2005 | Rosenberg | |
| 6,995,747 B2 | 2/2006 | Casebolt et al. | |
| 7,623,114 B2 | 11/2009 | Rank | |
| 7,639,232 B2 | 12/2009 | Grant et al. | |
| 7,791,588 B2 | 9/2010 | Tierling et al. | |
| 7,979,146 B2 | 7/2011 | Ullrich et al. | |
| 8,068,025 B2 | 11/2011 | Devenyi et al. | |
| 8,098,234 B2 | 1/2012 | Lacroix et al. | |
| 8,102,364 B2 | 1/2012 | Tierling | |
| 8,325,144 B1 | 12/2012 | Tierling et al. | |
| 3,427,286 A1 | 4/2013 | Grant et al. | |
| 8,466,778 B2 * | 6/2013 | Hwang | B06B 1/0207 |
| | | | 340/407.1 |
| 8,480,240 B2 | 7/2013 | Kashiyama | |
| 8,572,296 B2 | 10/2013 | Cruz-Hernandez et al. | |
| 8,593,269 B2 | 11/2013 | Grant et al. | |
| 8,648,829 B2 | 2/2014 | Shahoian et al. | |
| 8,947,216 B2 | 2/2015 | Da Costa et al. | |
| 8,981,915 B2 | 3/2015 | Birnbaum et al. | |
| 8,994,518 B2 | 3/2015 | Gregorio et al. | |
| 9,030,428 B2 | 5/2015 | Fleming | |
| 9,063,570 B2 | 6/2015 | Weddle et al. | |
| 9,083,821 B2 | 7/2015 | Hughes | |
| 9,092,059 B2 | 7/2015 | Bhatia | |
| 9,117,347 B2 * | 8/2015 | Matthews | G08B 6/00 |
| 9,128,523 B2 | 9/2015 | Buuck et al. | |
| 9,164,587 B2 | 10/2015 | Da Costa et al. | |
| 9,196,135 B2 | 11/2015 | Shah et al. | |
| 9,248,840 B2 | 2/2016 | Truong | |
| 9,354,704 B2 | 5/2016 | Lacroix et al. | |
| 9,368,005 B2 | 6/2016 | Cruz-Hernandez et al. | |
| 9,489,047 B2 | 11/2016 | Jiang et al. | |
| 9,507,423 B2 | 11/2016 | Gandhi et al. | |
| 9,513,709 B2 | 12/2016 | Gregorio et al. | |
| 9,520,036 B1 | 12/2016 | Buuck | |
| 9,588,586 B2 | 3/2017 | Rihn | |
| 9,640,047 B2 | 5/2017 | Choi et al. | |
| 9,652,041 B2 | 5/2017 | Jiang et al. | |
| 9,740,381 B1 | 8/2017 | Chaudhri et al. | |
| 9,842,476 B2 | 12/2017 | Rihn et al. | |
| 9,864,567 B2 | 1/2018 | Seo | |
| 9,881,467 B2 | 1/2018 | Levesque | |
| 9,946,348 B2 | 4/2018 | Ullrich et al. | |
| 9,959,744 B2 | 5/2018 | Koskan et al. | |
| 10,055,950 B2 | 8/2018 | Saboune et al. | |
| 10,074,246 B2 | 9/2018 | Da Costa et al. | |
| 10,110,152 B1 | 10/2018 | Hajati | |
| 10,175,763 B2 | 1/2019 | Shah | |
| 2002/0018578 A1 | 2/2002 | Burton | |
| 2003/0068053 A1 | 4/2003 | Chu | |
| 2006/0028095 A1 | 2/2006 | Maruyama et al. | |
| 2008/0167832 A1 | 7/2008 | Soss | |
| 2008/0293453 A1 | 11/2008 | Atlas et al. | |
| 2008/0316181 A1 | 12/2008 | Nurmi | |
| 2009/0079690 A1 | 3/2009 | Watson et al. | |
| 2009/0088220 A1 | 4/2009 | Persson | |
| 2009/0102805 A1 | 4/2009 | Meijer et al. | |
| 2010/0141408 A1 | 6/2010 | Doy et al. | |
| 2011/0141052 A1 | 6/2011 | Bernstein et al. | |
| 2012/0206246 A1 | 8/2012 | Cruz-Hernandez et al. |
| 2012/0206247 A1 | 8/2012 | Bhatia et al. |
| 2012/0306631 A1 | 12/2012 | Hughes |
| 2013/0141382 A1 | 6/2013 | Simmons et al. |
| 2013/0275058 A1 | 10/2013 | Awad |
| 2013/0289994 A1 | 10/2013 | Newman et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0118125 A1 | 5/2014 | Bhatia |
| 2014/0292501 A1 | 10/2014 | Lim et al. |
| 2014/0340209 A1 | 11/2014 | Lacroix et al. |
| 2015/0070260 A1 | 3/2015 | Saboune et al. |
| 2015/0084752 A1 | 3/2015 | Heubel et al. |
| 2015/0216762 A1 | 8/2015 | Oohashi et al. |
| 2015/0324116 A1 | 11/2015 | Marsden et al. |
| 2015/0325116 A1 | 11/2015 | Umminger, III |
| 2015/0341714 A1 | 11/2015 | Ahn et al. |
| 2016/0074278 A1 | 3/2016 | Muench et al. |
| 2016/0132118 A1 | 5/2016 | Park et al. |
| 2016/0179203 A1 | 6/2016 | Modarres et al. |
| 2016/0239089 A1 | 8/2016 | Taninaka et al. |
| 2016/0246378 A1 | 8/2016 | Sampanes et al. |
| 2016/0358605 A1 | 12/2016 | Ganong, III et al. |
| 2017/0078804 A1 | 3/2017 | Guo et al. |
| 2018/0059733 A1 | 3/2018 | Gault et al. |
| 2018/0059793 A1 | 3/2018 | Hajati |
| 2018/0082673 A1 | 3/2018 | Tzanetos |
| 2018/0084362 A1 | 3/2018 | Zhang et al. |
| 2018/0151036 A1 | 5/2018 | Cha et al. |
| 2018/0158289 A1 | 6/2018 | Vasilev et al. |
| 2018/0160227 A1 | 6/2018 | Lawrence et al. |
| 2018/0237033 A1 | 8/2018 | Hakeem et al. |
| 2018/0253123 A1 | 9/2018 | Levesque et al. |
| 2018/0321748 A1 | 11/2018 | Rao et al. |
| 2018/0367897 A1 | 12/2018 | Bjork et al. |
| 2019/0227628 A1 | 1/2019 | Rand et al. |
| 2019/0064925 A1 | 2/2019 | Kim et al. |
| 2019/0073078 A1 | 3/2019 | Sheng et al. |
| 2019/0103829 A1 | 4/2019 | Vasudevan et al. |
| 2019/0206396 A1 | 7/2019 | Chen |
| 2019/0215349 A1 | 7/2019 | Adams et al. |
| 2019/0114496 A1 | 8/2019 | Lesso |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0311590 A1 | 10/2019 | Doy et al. |

FOREIGN PATENT DOCUMENTS

| | | |
|---|---|---|
| EP | 0784844 B1 | 6/2005 |
| EP | 2600225 A1 | 6/2013 |
| EP | 2846218 A1 | 3/2015 |
| EP | 3379382 A1 | 9/2018 |
| IN | 201747044027 | 8/2018 |
| JP | H02130433 B2 | 5/1990 |
| JP | 6026751 B2 | 11/2016 |
| JP | 6321351 | 5/2018 |
| KR | 20120126446 A | 11/2012 |
| WO | 2013186845 A1 | 12/2013 |
| WO | 2017113651 A1 | 7/2017 |
| WO | 2018053159 A1 | 3/2018 |

OTHER PUBLICATIONS

Combined Search and Examination Report, UKIPO, Application No. GB1720424.9, dated Jun. 5, 2018.
International Search Report and Written Opinion of the International Searching Authority, International Application No. PCT/GB2019/050964, dated Sep. 3, 2019.
International Search Report and Written Opinion of the International Searching Authority, International Application No. PCT/GB2019/050770, dated Jul. 5, 2019.

* cited by examiner

INTEGRATED HAPTIC SYSTEM

RELATED APPLICATION

The present disclosure claims priority to U.S. Provisional Patent Application Ser. No. 62/503,163, filed May 8, 2017, and U.S. Provisional Patent Application Ser. No. 62/540,921, filed Aug. 3, 2017, both of which are incorporated by reference herein in their entirety.

FIELD OF DISCLOSURE

The present disclosure relates in general to electronic devices with user interfaces, (e.g., mobile devices, game controllers, instrument panels, etc.), and more particularly, an integrated haptic system for use in a system for mechanical button replacement in a mobile device, for use in haptic feedback for capacitive sensors, and/or other suitable applications.

BACKGROUND

Linear resonant actuators (LRAs) and other vibrational actuators (e.g., rotational actuators, vibrating motors, etc.) are increasingly being used in mobile devices (e.g., mobile phones, personal digital assistants, video game controllers, etc.) to generate vibrational feedback for user interaction with such devices. Typically, a force/pressure sensor detects user interaction with the device (e.g., a finger press on a virtual button of the device) and in response thereto, the linear resonant actuator vibrates to provide feedback to the user. For example, a linear resonant actuator may vibrate in response to force to mimic to the user the feel of a mechanical button click.

One disadvantage of existing haptic systems is that existing approaches to processing of signals of a force sensor and generating of a haptic response thereto often have longer than desired latency, such that the haptic response may be significantly delayed from the user's interaction with the force sensor. Thus, in applications in which a haptic system is used for mechanical button replacement, capacitive sensor feedback, or other application, and the haptic response may not effectively mimic the feel of a mechanical button click. Accordingly, systems and methods that minimize latency between a user's interaction with a force sensor and a haptic response to the interaction are desired.

In addition, to create appropriate and pleasant haptic feelings for a user, a signal driving a linear resonant actuator may need to be carefully designed and generated. In mechanical button replacement application, a desirable haptic response may be one in which the vibrational impulse generated by the linear resonant actuator should be strong enough to give a user prominent notification as a response to his/her finger pressing and/or releasing, and the vibrational impulse should be short, fast, and clean from resonance tails to provide a user a "sharp" and "crisp" feeling. Optionally, different control algorithms and stimulus may be applied to a linear resonant actuator, to alter the performance to provide alternate tactile feedback—possibly denoting certain user modes in the device—giving more "soft" and "resonant" tactile responses.

SUMMARY

In accordance with the teachings of the present disclosure, the disadvantages and problems associated with haptic feedback in a mobile device may be reduced or eliminated.

In accordance with embodiments of the present disclosure, an integrated haptic system may include a digital signal processor and an amplifier communicatively coupled to the digital signal processor and integrated with the digital signal processor into the integrated haptic system. The digital signal processor may be configured to receive an input signal indicative of a force applied to a force sensor and generate a haptic playback signal responsive to the input signal. The amplifier may be configured to amplify the haptic playback signal and drive a vibrational actuator communicatively coupled to the amplifier with the haptic playback signal as amplified by the amplifier.

In accordance with these and other embodiments of the present disclosure, a method may include receiving, by a digital signal processor, an input signal indicative of a force applied to a force sensor. The method may also include generating, by the digital signal processor, a haptic playback signal responsive to the input signal. The method may further include driving, with an amplifier communicatively coupled to the digital signal processor and integrated with the digital signal processor into an integrated haptic system, the haptic playback signal as amplified by the amplifier.

In accordance with these and other embodiments of the present disclosure, an article of manufacture may include a non-transitory computer-readable medium computer-executable instructions carried on the computer-readable medium, the instructions readable by a processor, the instructions, when read and executed, for causing the processor to receive an input signal indicative of a force applied to a force sensor and generate a haptic playback signal responsive to the input signal, such that an amplifier communicatively coupled to the processor and integrated with the digital signal processor into an integrated haptic system, amplifies and drives the haptic playback signal.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
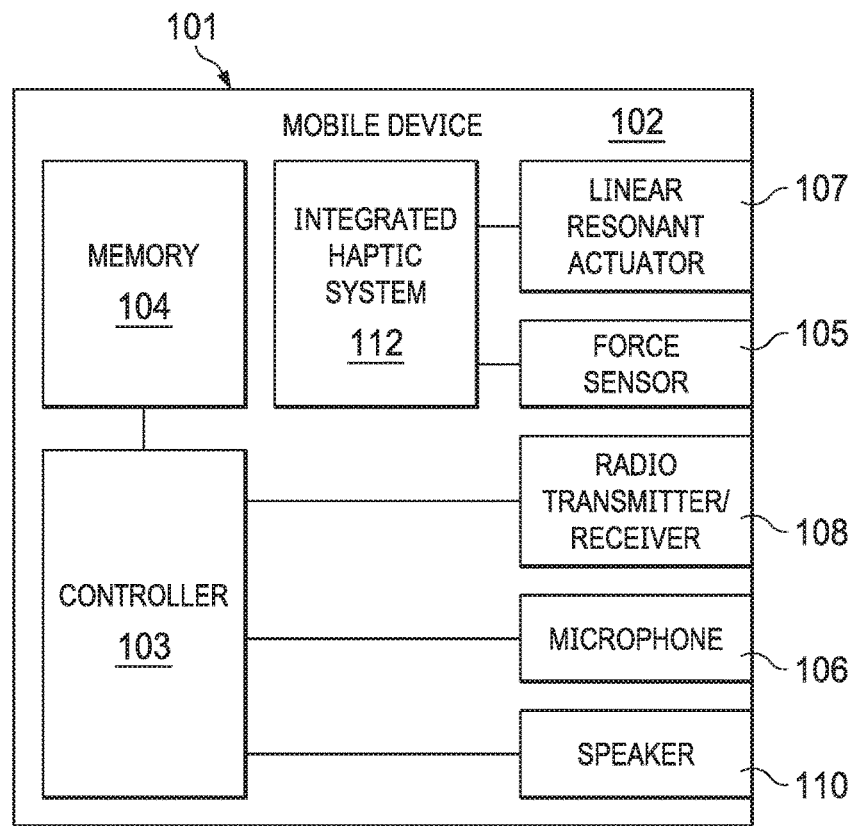
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a force sensor 105, a microphone 106, a linear resonant actuator 107, a radio transmitter/receiver 108, a speaker 110, and an integrated haptic system 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Force sensor 105 may be housed within enclosure 101, and may include any suitable system, device, or apparatus for sensing a force, a pressure, or a touch (e.g., an interaction with a human finger) and generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general purpose input/output signal (GPIO) associated with an input signal to which haptic feedback is given (e.g., a capacitive touch screen sensor or other capacitive sensor to which haptic feedback is provided). For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from integrated haptic system 112, may render haptic feedback to a user of mobile device 102 for at least one of mechanical button replacement and capacitive sensor feedback.

Integrated haptic system 112 may be housed within enclosure 101, may be communicatively coupled to force sensor 105 and linear resonant actuator 107, and may include any system, device, or apparatus configured to receive a signal from force sensor 105 indicative of a force applied to mobile device 102 (e.g., a force applied by a human finger to a virtual button of mobile device 102) and generate an electronic signal for driving linear resonant actuator 107 in response to the force applied to mobile device 102. Detail of an example integrated haptic system in accordance with embodiments of the present disclosure is depicted in FIG. 2.

Although specific example components are depicted above in FIG. 1 as being integral to mobile device 102 (e.g., controller 103, memory 104, force sensor 105, microphone 106, radio transmitter/receiver 108, speakers(s) 110), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1 (including but not limited to a keypad, a touch screen, and a display), thus allowing a user to interact with and/or otherwise manipulate mobile device 102 and its associated components.

Figure 2:
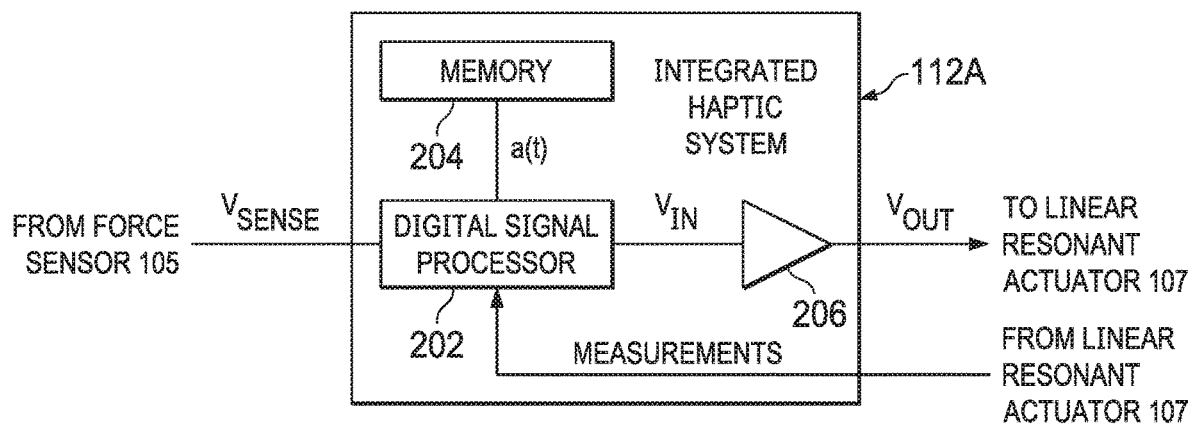
FIG. 2 illustrates a block diagram of selected components of an example integrated haptic system, in accordance with embodiments of the present disclosure.

FIG. 2 illustrates a block diagram of selected components of an example integrated haptic system 112A, in accordance with embodiments of the present disclosure. In some embodiments, integrated haptic system 112A may be used to implement integrated haptic system 112 of FIG. 1. As shown in FIG. 2, integrated haptic system 112A may include a digital signal processor (DSP) 202, a memory 204, and an amplifier 206.

DSP 202 may include any system, device, or apparatus configured to interpret and/or execute program instructions and/or process data. In some embodiments, DSP 202 may interpret and/or execute program instructions and/or process data stored in memory 204 and/or other computer-readable media accessible to DSP 202.

Memory 204 may be communicatively coupled to DSP 202, and may include any system, device, or apparatus configured to retain program instructions and/or data for a period of time (e.g., computer-readable media). Memory 204 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Amplifier 206 may be electrically coupled to DSP 202 and may comprise any suitable electronic system, device, or apparatus configured to increase the power of an input signal $V_{IN}$ (e.g., a time-varying voltage or current) to generate an output signal $V_{OUT}$. For example, amplifier 206 may use electric power from a power supply (not explicitly shown) to increase the amplitude of a signal. Amplifier 206 may include any suitable amplifier class, including without limitation, a Class-D amplifier.

In operation, memory 204 may store one or more haptic playback waveforms. In some embodiments, each of the one or more haptic playback waveforms may define a haptic response a(t) as a desired acceleration of a linear resonant actuator (e.g., linear resonant actuator 107) as a function of time. DSP 202 may be configured to receive a force signal $V_{SENSE}$ from force sensor 105 indicative of force applied to force sensor 105. Either in response to receipt of force signal $V_{SENSE}$ indicating a sensed force or independently of such receipt, DSP 202 may retrieve a haptic playback waveform from memory 204 and process such haptic playback waveform to determine a processed haptic playback signal $V_{IN}$. In embodiments in which amplifier 206 is a Class D amplifier, processed haptic playback signal $V_{IN}$ may comprise a pulse-width modulated signal. In response to receipt of force signal $V_{SENSE}$ indicating a sensed force, DSP 202 may cause processed haptic playback signal $V_{IN}$ to be output to amplifier 206, and amplifier 206 may amplify processed haptic playback signal $V_{IN}$ to generate a haptic output signal $V_{OUT}$ for driving linear resonant actuator 107. Detail of an example processing system implemented by DSP 202 is depicted in FIG. 3.

In some embodiments, integrated haptic system 112A may be formed on a single integrated circuit, thus enabling lower latency than existing approaches to haptic feedback control. By providing integrated haptic system 112A as part of a single monolithic integrated circuit, latencies between various interfaces and system components of integrated haptic system 112A may be reduced or eliminated.

Figure 3:
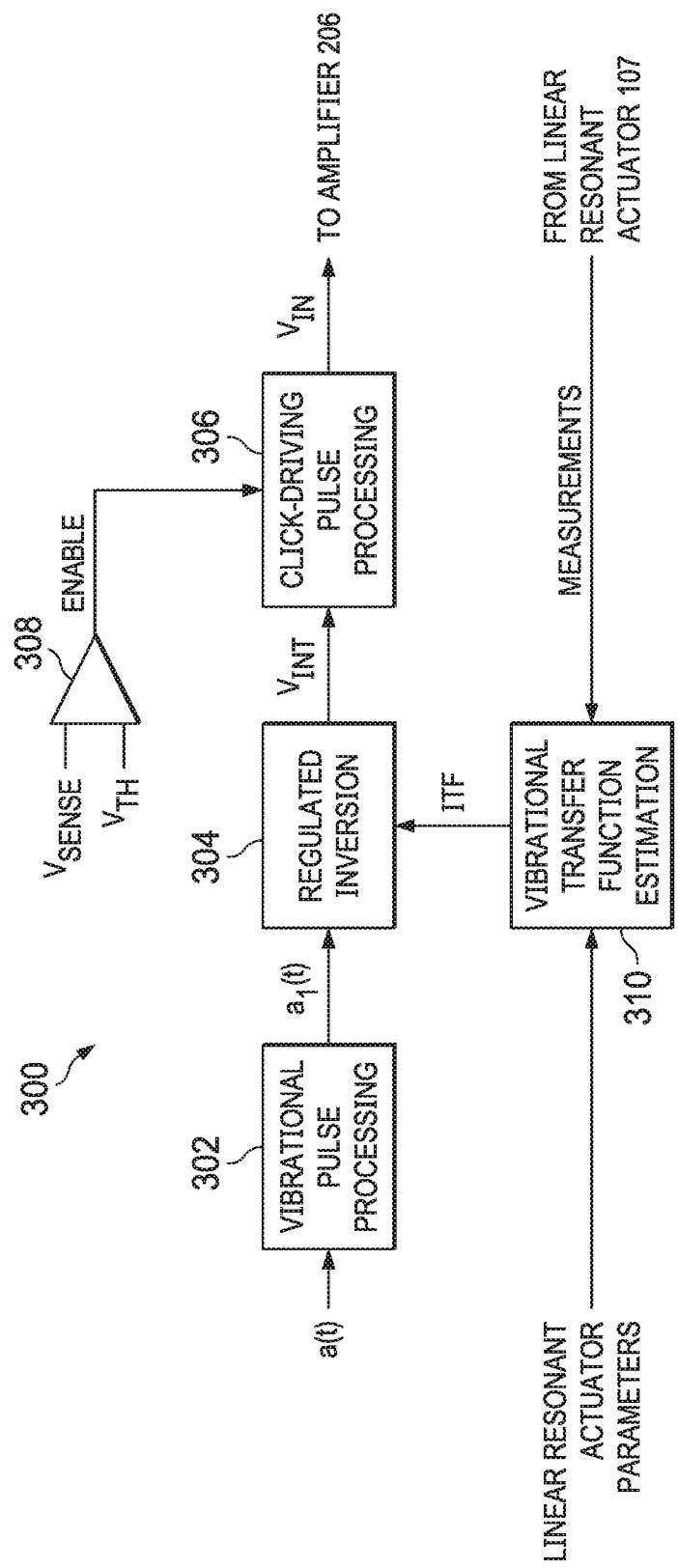
FIG. 3 illustrates a block diagram of selected components of an example processing system for use in the integrated haptic system of FIG. 2, in accordance with embodiments of the present disclosure.

As shown in FIG. 3, DSP 202 may receive diagnostic inputs from which processing system 300 may monitor and adjust operation of amplifier 206 in response thereto. For example, as discussed below with respect to FIG. 3, DSP 202 may receive measurements from linear resonant actuator 107 to estimate the vibrational transfer function of linear resonant actuator 107. However, in some embodiments, DSP 202 may receive and monitor one or more other diagnostic inputs, and DSP 202 may control operation of amplifier 206 in response thereto. For example, in some embodiments, DSP 202 may monitor a current level associated with linear resonant actuator 107 and/or a voltage level associated with linear resonant actuator 107. From such measurements, DSP 202 may be able to infer or calculate a status (e.g., status of motion) of linear resonant actuator 107. For example, from a monitored voltage and current, DSP 202 may be able to employ a mathematical model of linear resonant actuator 107 to estimate a displacement, velocity, and/or acceleration of linear resonant actuator 107. As another example, DSP 202 may inject a high-frequency signal into linear resonant actuator 107 and infer an inductance of linear resonant actuator 107 based on the current and/or voltage responses of linear resonant actuator 107 to the injected signal. From the inductance, DSP 202 may be able to estimate a displacement of linear resonant actuator 107. Based on determined status information (e.g., displacement, velocity, and/or acceleration), DSP 202 may control processed haptic playback signal $V_{IN}$ for any suitable purpose, including protecting linear resonant actuator 107 from over-excursion that could lead to damage to linear resonant actuator 107 or other components of mobile device 102. As yet another example, one or more diagnostic inputs may be monitored to determine an operational drift of linear resonant actuator 107, and DSP 202 may control amplifier 206 and/or processed haptic playback signal $V_{IN}$ in order to account for the operational drift. As a further example, one or more diagnostic inputs may be monitored to determine temperature effects of linear resonant actuator 107 (e.g., thermally induced changes in the performance of linear resonant actuator 107), and DSP 202 may control amplifier 206 and/or processed haptic playback signal $V_{IN}$ in order to account for the temperature effects.

FIG. 3 illustrates a block diagram of selected components of an example processing system 300 implemented by DSP 202, in accordance with embodiments of the present disclosure. As shown in FIG. 3, processing system 300 may include vibrational pulse processing 302, regulated inversion 304, click-driving pulse processing 306, a comparator 308, and vibrational transfer function estimation 310. In operation, vibrational pulse processing 302 may receive a haptic playback waveform a(t) (or relevant parameters of such a waveform such as frequency and duration) and process such waveform to generate an intermediate signal $a_1(t)$. Processing performed by vibrational pulse processing 302 may include, without limitation, filtering (e.g., bandpass filtering) for frequency bands of interest, equalization of haptic playback waveform a(t) to obtain a desired spectral shape, and/or temporal truncation or extrapolation of haptic playback waveform a(t). By adjusting or tuning the temporal duration and frequency envelope of haptic playback waveform a(t), various haptic feelings as perceived by a user and/or audibility of the haptic response may be achieved.

Regulated inversion 304 may apply an inverse transfer function ITF to intermediate signal $a_1(t)$, either in the frequency domain or equivalently in the time domain through inverse filtering. Such inverse transfer function ITF may be generated from vibrational transfer function estimation 310 based on actual vibrational measurements of linear resonant actuator 107 and/or model parameters of linear resonant actuator 107. Inverse transfer function ITF may be the inverse of a transfer function that correlates output voltage signal $V_{OUT}$ to actual acceleration of linear resonant actuator 107. By applying inverse transfer function ITF to intermediate signal $a_1(t)$, regulated inversion 304 may generate an inverted vibration signal $V_{INT}$ in order to apply inversion to specific target vibrational click pulses to obtain an approximation of certain desired haptic click signals to drive the vibrational actuators for the generation of haptic clicks. In embodiments in which inverse transfer function ITF is calculated based on measurements of linear resonant actuator 107, processing system 300 may implement a closed-loop feedback system for generating output signal $V_{OUT}$, such that processing system 300 may track vibrational characteristics of linear resonant actuator 107 over the lifetime of linear resonant actuator 107 to enable more accurate control of the haptic response generated by integrated haptic system 112A.

In some embodiments, processing system 300 may not employ an adaptive inverse transfer function ITF, and instead apply a fixed inverse transfer function ITF. In yet other embodiments, the haptic playback waveforms a(t) stored in memory 204 may already include waveforms already adjusted by a fixed inverse transfer function ITF, in which case processing system 300 may not include blocks 302 and 304, and haptic playback waveforms a(t) may be fed directly to click-driving pulse processing block 306.

Click-driving pulse processing 306 may receive inverted vibration signal $V_{INT}$ and control resonant tail suppression of inverted vibration signal $V_{INT}$ in order to generate processed haptic playback signal $V_{IN}$. Processing performed by click-driving pulse processing 306 may include, without limitation, truncation of inverted vibration signal $V_{INT}$, minimum phase component extraction for inverted vibration signal $V_{INT}$, and/or filtering to control audibility of haptic playback signal $V_{IN}$.

Comparator 308 may compare a digitized version of force signal $V_{SENSE}$ to a signal threshold $V_{TH}$ related to a threshold force, and responsive to force signal $V_{SENSE}$ exceeding signal threshold $V_{TH}$, may enable haptic playback signal $V_{IN}$ to be communicated to amplifier 206, such that amplifier 206 may amplify haptic playback signal $V_{IN}$ to generate output signal $V_{OUT}$.

Although FIG. 3 depicts comparator 308 as a simple analog comparator, in some embodiments, comparator 308 may include more detailed logic and/or comparison than shown in FIG. 3, with the enable signal ENABLE output by comparator 308 depending on one or more factors, parameters, and/or measurements in addition to or in lieu of comparison to a threshold force level.

In addition, although FIG. 3 depicts enable signal ENABLE being communicated to click-driving pulse processing 306 and selectively enabling/disabling haptic playback signal $V_{IN}$, in other embodiments, ENABLE signal ENABLE may be communicated to another component of processing system 300 (e.g., vibrational pulse processing 302) in order to enable, disable, or otherwise condition an output of such other component.

Figure 4:
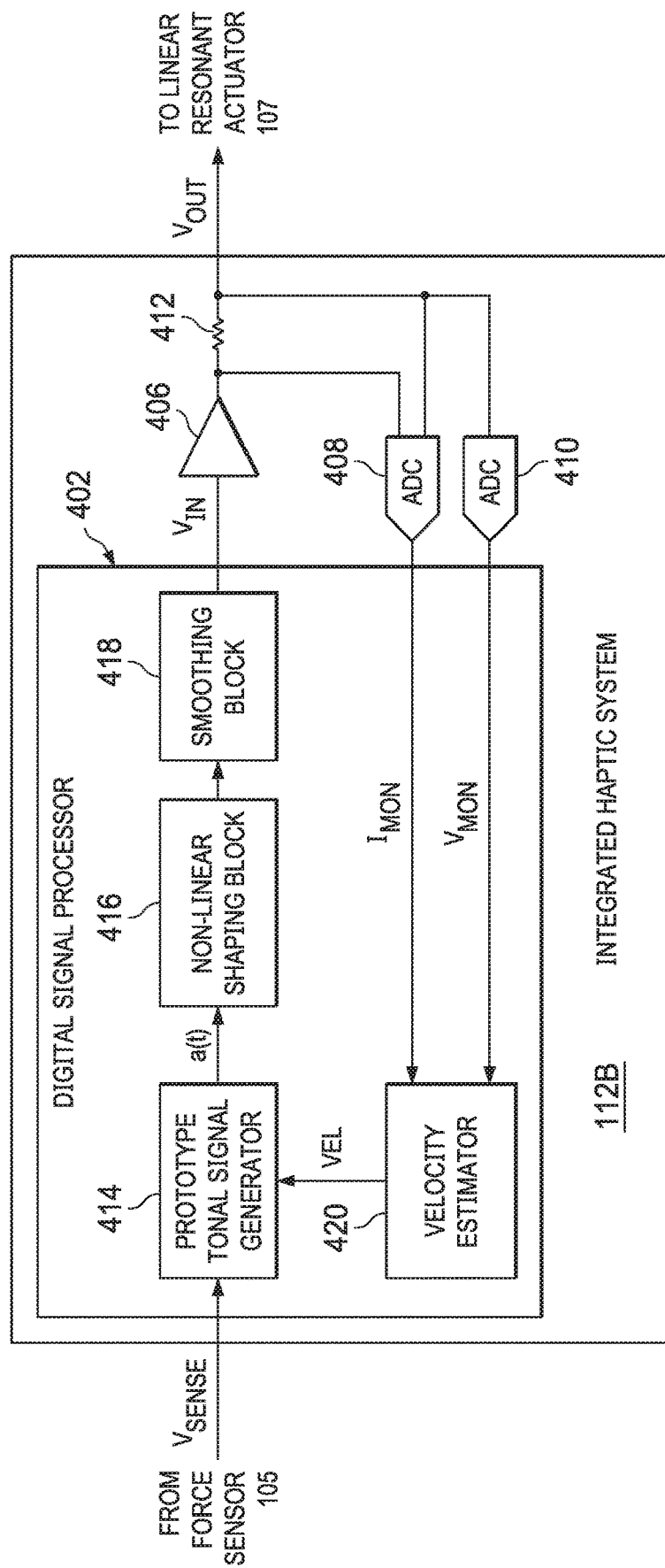
FIG. 4 illustrates a block diagram of selected components of another example integrated haptic system, in accordance with embodiments of the present disclosure.

FIG. 4 illustrates a block diagram of selected components of an example integrated haptic system 112B, in accordance with embodiments of the present disclosure. In some embodiments, integrated haptic system 112B may be used to implement integrated haptic system 112 of FIG. 1. As shown in FIG. 4, integrated haptic system 112B may include a digital signal processor (DSP) 402, an amplifier 406, an analog-to-digital converter (ADC) 408, and an ADC 410.

DSP 402 may include any system, device, or apparatus configured to interpret and/or execute program instructions and/or process data. In some embodiments, DSP 402 may interpret and/or execute program instructions and/or process data stored in a memory and/or other computer-readable media accessible to DSP 402. As shown in FIG. 4, DSP 402 may implement a prototype tonal signal generator 414, nonlinear shaping block 416, a smoothing block 418, and a velocity estimator 420.

Prototype tonal signal generator 414 may be configured to generate a tonal driving signal a(t) at or near a resonance frequency $f_0$ of linear resonant actuator 107, and monitors an estimated velocity signal VEL generated by velocity estimator 420 to determine an occurrence of a predefined threshold level for estimated velocity signal VEL or for an occurrence of a peak of estimated velocity signal VEL. At the occurrence of the predefined threshold level or peak, prototype tonal signal generator 414 may then cause a change of polarity of driving signal a(t), which in turn may cause a moving mass of linear resonant actuator 107 to experience a sudden change in velocity, creating a large acceleration in linear resonant actuator 107, resulting in a sharp haptic feeling. Driving signal a(t) generated by prototype tonal signal generator 414 may be followed by nonlinear shaping block 416 that shapes the waveform driving signal a(t) for a more efficient utilization of a driving voltage, and may be further smoothed by smoothing block 418 to generate input voltage $V_{IN}$.

Velocity estimator 420 may be configured to, based on a measured voltage $V_{MON}$ of linear resonant actuator 107, a measured current $I_{MON}$ of linear resonant actuator 107, and known characteristics of linear resonant actuator 107 (e.g., modeling of a velocity of linear resonant actuator 107 as a function of voltage and current of linear resonant actuator 107), calculate an estimated velocity VEL of linear resonant actuator 107. In some embodiments, one or more other measurements or characteristics associated with linear resonant actuator 107 (e.g., inductance) may be used in addition to or in lieu of a measured voltage and measured current in order to calculate estimated velocity VEL.

Amplifier 406 may be electrically coupled to DSP 402 and may comprise any suitable electronic system, device, or apparatus configured to increase the power of an input signal $V_{IN}$ (e.g., a time-varying voltage or current) to generate an output signal $V_{OUT}$. For example, amplifier 406 may use electric power from a power supply (e.g., a boost power supply, not explicitly shown) to increase the amplitude of a signal. Amplifier 406 may include any suitable amplifier class, including without limitation, a Class-D amplifier.

ADC 408 may comprise any suitable system, device, or apparatus configured to convert an analog current associated with linear resonant actuator 107 into a digitally equivalent measured current signal $I_{MON}$. Similarly, ADC 410 may comprise any suitable system, device, or apparatus configured to convert an analog voltage across sense resistor 412 (having a voltage indicative of an analog current associated with linear resonant actuator 107) into a digitally equivalent measured voltage signal $V_{MON}$.

In some embodiments, integrated haptic system 112B may be formed on a single integrated circuit, thus enabling lower latency than existing approaches to haptic feedback control.

Figure 5:
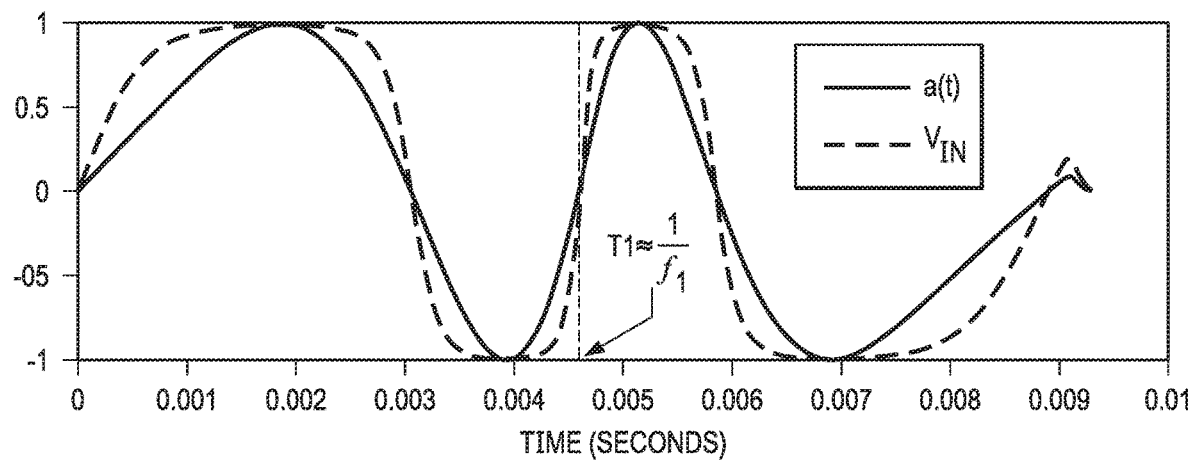
FIG. 5 illustrates a graph showing example waveforms of haptic driving signals that may be generated, in accordance with embodiments of the present disclosure.

FIG. 5 illustrates a graph depicting example waveforms of haptic driving signals that may be generated, in accordance with embodiments of the present disclosure. For example, as shown in FIG. 5, prototype tonal signal generator 414 may generate a tonal acceleration signal a(t) which begins at resonant frequency $f_0$ and ends at a higher frequency with an average frequency $f_1$ shown in FIG. 5. Such average frequency $f_1$ may be chosen to be a frequency of tone that achieved a maximum acceleration level that avoids clipping of output voltage $V_{OUT}$. To illustrate, the maximum achievable vibration of linear resonant actuator 107, in terms of acceleration, may be restricted. As an example, linear resonant actuator 107 may be subject to an excursion limit, which defines a maximum displacement (e.g., in both a positive and negative direction) that a moving mass of linear resonant actuator 107 may displace without contacting non-moving parts of a device including linear resonant actuator 107 or otherwise causing audible buzzing and/or rattling distortions.

Figure 6:
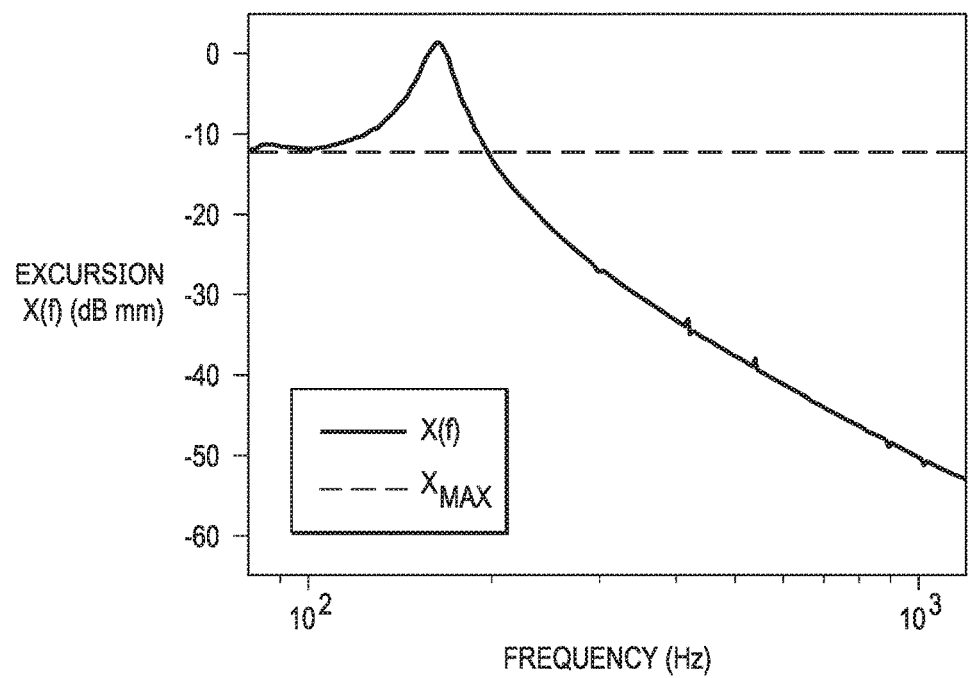
FIG. 6 illustrates a graph depicting an example transfer function of displacement of linear resonant actuator as a function of frequency at a voltage level equal to a maximum static excursion occurring at low frequencies, in accordance with embodiments of the present disclosure.

FIG. 6 illustrates a graph depicting an example transfer function of displacement of linear resonant actuator 107 as a function of frequency (x(f)) at a voltage level equal to a maximum static excursion $x_{MAX}$ occurring at low frequencies, in accordance with embodiments of the present disclosure. It is apparent from the graph of FIG. 6 that linear resonant actuator 107 may not be able to tolerate such a voltage level, because at resonance frequency $f_0$, the excursion x(f) it generates will be over static excursion limit $x_{MAX}$ and therefore cause clipping. In that sense, static excursion limit $x_{MAX}$ may be considered the "clipping-free" excursion limit.

Figure 7:
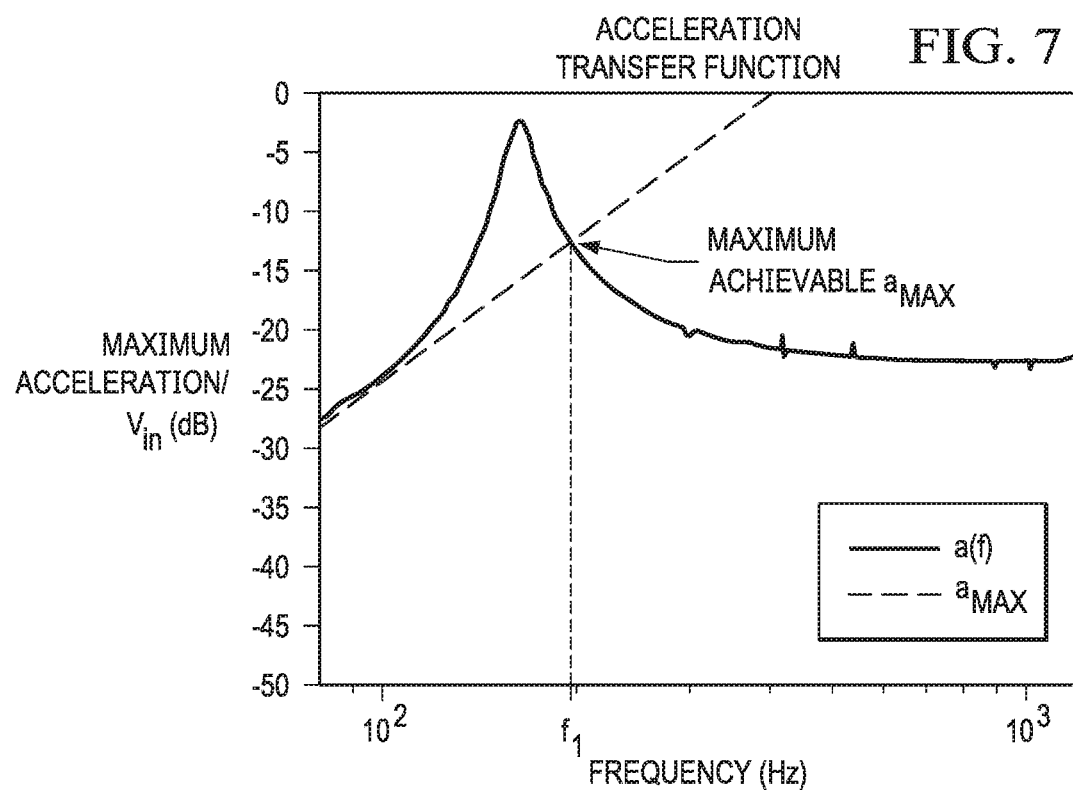
FIG. 7 illustrates a graph depicting an example transfer function of acceleration of linear resonant actuator as a function of frequency and a maximum acceleration at maximum excursion, in accordance with embodiments of the present disclosure.

FIG. 7 illustrates a graph depicting an example transfer function of acceleration of linear resonant actuator 107 as a function of frequency (a(f)) and a maximum acceleration $a_{MAX}$ at maximum excursion $x_{MAX}$, in accordance with embodiments of the present disclosure. In many respects, FIG. 7 is a translation of FIG. 6 from the displacement domain to the acceleration domain. From FIG. 7, it is seen that, below a certain frequency $f_1$, the maximum acceleration level linear resonant actuator 107 may generate may be restricted by the clipping-free excursion limit, and not by a voltage of amplifier 406. This means that below the certain frequency linear resonant actuator 107 needs to be driven at an attenuated voltage level. On the other hand, for such a maximum voltage level that nearly reaches a maximum excursion limit $x_{MAX}$ without clipping, the maximum achievable clipping-free acceleration level $a_{MAX}$ is achievable not at a resonance frequency $f_0$, but at a chosen frequency $f_1$, which is above resonance.

Such chosen frequency $f_1$ may provide a good choice of initialization for the design of haptic clicks and for the timing (e.g., a passage of time T1, as shown in FIG. 3) of the change in polarity of the acceleration signal a(t) to achieve an acceleration peak. However, in addition to the specific example of a very short pulse described above, other examples of waveforms with longer cycles may be used, as well as other logics to determine a passage of time T1 (e.g., time T1) for changing polarity of the acceleration signal a(t), the effect of which is to force the moving mass to rapidly change velocity and generate a large acceleration peak. The larger the change rate of velocity, the higher the acceleration peak linear resonant actuator 107 may create.

Figure 8:
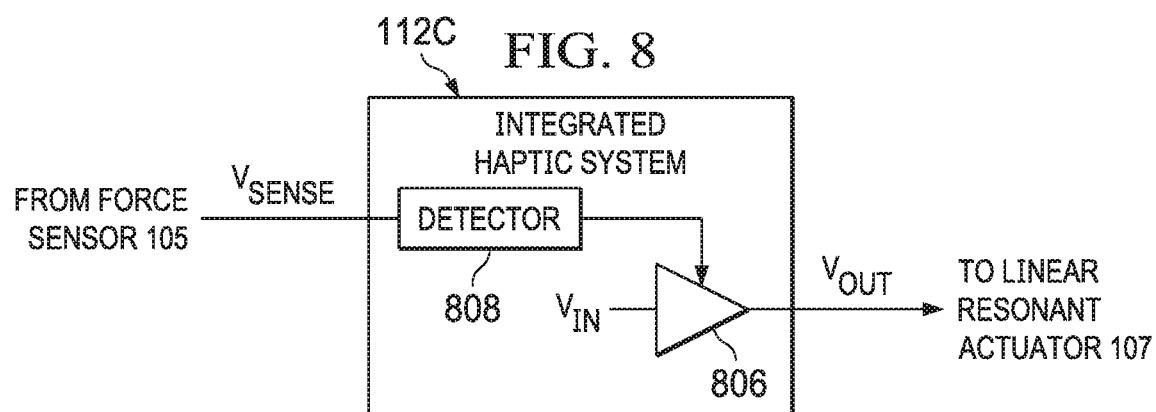
FIG. 8 illustrates a block diagram of selected components of another example integrated haptic system, in accordance with embodiments of the present disclosure.

FIG. 8 illustrates a block diagram of selected components of another example integrated haptic system 112C, in accordance with embodiments of the present disclosure. In some embodiments, integrated haptic system 112C may be used to implement integrated haptic system 112 of FIG. 1. As shown in FIG. 8, integrated haptic system 112C may include a detector 808 and an amplifier 806.

Detector 808 may include any system, device, or apparatus configured to detect a signal (e.g., $V_{SENSE}$) indicative of a force. In some embodiments, such signal may be a signal generated by a force sensor. In other embodiments, such signal may comprise a GPIO signal indicative of a force applied to a force sensor. In some embodiments, detector 808 may simply detect whether GPIO signal is asserted or deasserted. In other embodiments, signal $V_{SENSE}$ may indicate a magnitude of force applied and may apply logic (e.g., analog-to-digital conversion where signal $V_{SENSE}$ is analog, comparison to a threshold force level, and/or logic associated with other measurements or parameters). In any event, responsive to signal $V_{SENSE}$ indicating a requisite force, detector 808 may enable amplifier 806 (e.g., by enabling its power supply or power supply boost mode) such that amplifier 806 may amplify haptic playback signal $V_{IN}$ (which may be generated by a component internal to or external to integrated haptic system 112C) to generate output signal $V_{OUT}$. Accordingly, amplifier 806 may be maintained in a low-power or inactive state until a requisite input signal is received by integrated haptic system 112C, at which amplifier may be powered up or effectively switched on. Allowing for amplifier 806 to be kept in a low-power or inactive state until a requisite input is received may result in a considerable reduction in power consumption of a circuit, and enable "always-on" functionality for a device incorporating integrated haptic system 112C.

In alternative embodiments, detector 808 may be configured to, responsive to a requisite signal $V_{SENSE}$, enable haptic playback signal $V_{IN}$ to be communicated to amplifier 806, such that amplifier 806 may amplify haptic playback signal $V_{IN}$ to generate output signal $V_{OUT}$.

In some embodiments, all or a portion of detector 808 may be implemented by a DSP.

Amplifier 806 may be electrically coupled to detector 808 and may comprise any suitable electronic system, device, or apparatus configured to increase the power of an input signal $V_{IN}$ (e.g., a time-varying voltage or current) to generate an output signal $V_{OUT}$. For example, amplifier 806 may use electric power from a power supply (not explicitly shown) to increase the amplitude of a signal. Amplifier 806 may include any suitable amplifier class, including without limitation, a Class-D amplifier.

In some embodiments, integrated haptic system 112C may be formed on a single integrated circuit, thus enabling lower latency than existing approaches to haptic feedback control.

Figure 9:
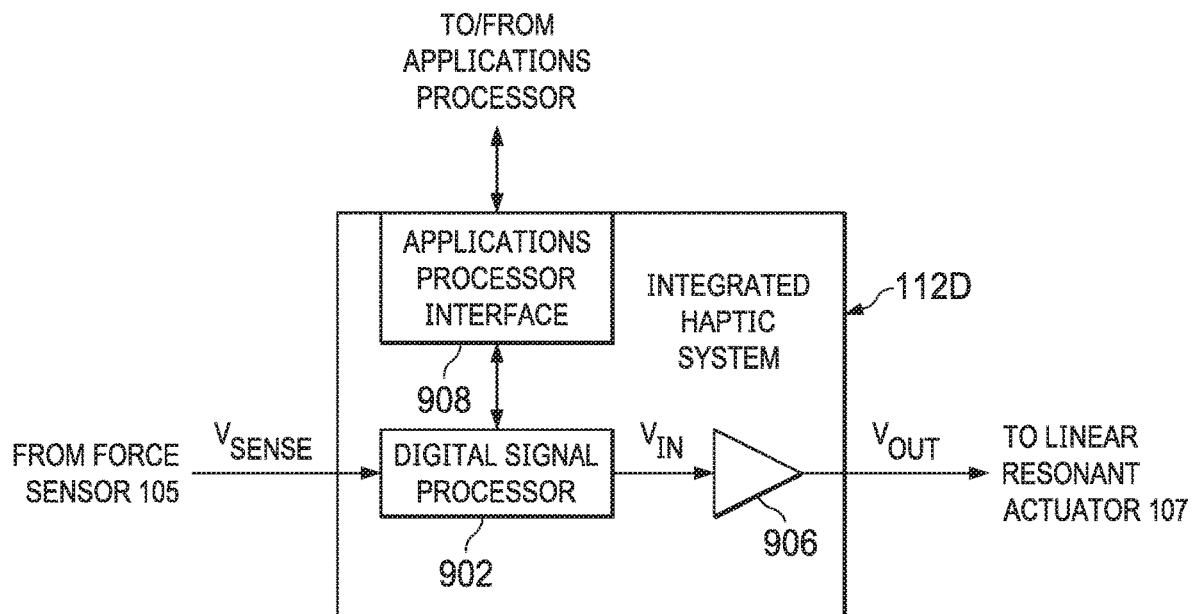
FIG. 9 illustrates a block diagram of selected components of another example integrated haptic system, in accordance with embodiments of the present disclosure.

FIG. 9 illustrates a block diagram of selected components of an example integrated haptic system 112D, in accordance with embodiments of the present disclosure. In some embodiments, integrated haptic system 112D may be used to implement integrated haptic system 112 of FIG. 1. As shown in FIG. 9, integrated haptic system 112D may include a digital signal processor (DSP) 902, an amplifier 906, and an applications processor interface 908.

DSP 902 may include any system, device, or apparatus configured to interpret and/or execute program instructions and/or process data. In some embodiments, DSP 902 may interpret and/or execute program instructions and/or process data stored in a memory and/or other computer-readable media accessible to DSP 902.

Amplifier 906 may be electrically coupled to DSP 902 and may comprise any suitable electronic system, device, or apparatus configured to increase the power of an input signal YIN (e.g., a time-varying voltage or current) to generate an output signal $V_{OUT}$. For example, amplifier 906 may use electric power from a power supply (not explicitly shown) to increase the amplitude of a signal. Amplifier 906 may include any suitable amplifier class, including without limitation, a Class-D amplifier.

Applications processor interface 908 may be communicatively coupled to DSP 902 and an applications processor (e.g., controller 103 of FIG. 1) external to integrated haptic system 112D. Accordingly, applications processor interface 908 may enable communication between integrated haptic system 112D and an application executing on an applications processor.

In some embodiments, integrated haptic system 112D may be formed on a single integrated circuit, thus enabling lower latency than existing approaches to haptic feedback control.

In operation, DSP 902 may be configured to receive a force signal $V_{SENSE}$ from force sensor 105 indicative of force applied to force sensor 105. In response to receipt of force signal $V_{SENSE}$ indicating a sensed force, DSP 902 may generate a haptic playback signal $V_{IN}$ and communicate haptic playback signal $V_{IN}$ to amplifier 906. In addition, in response to the receipt of force signal $V_{SENSE}$ indicating a sensed force, DSP 902 may communicate an activity notification to an appropriate applications processor via applications processor interface 908. DSP 902 may further be configured to receive communications from an applications processor via applications processor interface 908 and generate (in addition to and in lieu of generation responsive to receipt of force signal $V_{SENSE}$) haptic playback signal $V_{IN}$ and communicate haptic playback signal $V_{IN}$ to amplifier 906.

As the output for an initial haptic feedback response can be generated by the integrated haptic system 112D, integrated haptic system 112D may be configured to provide a low-latency response time for the generation of immediate haptic feedback. Subsequent to the initial feedback being generated, the control of additional haptic feedback signals may be determined by a separate applications processor arranged to interface with integrated haptic system 112D. By offloading the control of subsequent haptic driver signals to a separate applications processor, integrated haptic system 112D may be optimized for low-power, low-latency performance, to generate the initial haptic feedback response. The initial output signal $V_{OUT}$ may be provided at a relatively low resolution, resulting in the generation of a relatively simplified haptic feedback response. For example, the initial output signal $V_{OUT}$ may be provided as a globalized feedback response. Subsequent to the initial response, the applications processor may be used to generate more detailed haptic feedback outputs, for example providing for localized haptic feedback responses, which may require increased processing resources when compared with the relatively straightforward generation of a globalized haptic feedback response.

As another example, in an effort to minimize the power consumption of mobile device 102 for always-on operation, the integrated haptic system 112D may be configured to monitor a single input from a single force-sensing transducer (e.g., force sensor 105) to detect a user input. However, once an initial user input has been detected, the power and resources of an applications processor may be used to provide more detailed signal analysis and response. The applications processor may be configured to receive input signals from multiple force-sensing transducers, and/or to generate output signals for multiple haptic transducers.

Figure 10:
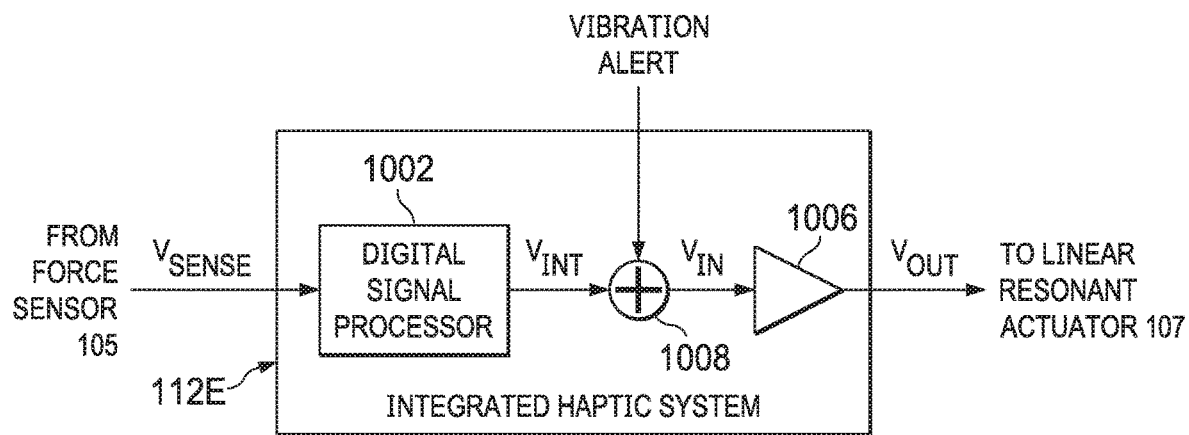
FIG. 10 illustrates a block diagram of selected components of another example integrated haptic system, in accordance with embodiments of the present disclosure.

FIG. 10 illustrates a block diagram of selected components of an example integrated haptic system 112E, in accordance with embodiments of the present disclosure.

In some embodiments, integrated haptic system 112E may be used to implement integrated haptic system 112 of FIG. 1. As shown in FIG. 10, integrated haptic system 112E may include a digital signal processor (DSP) 1002, an amplifier 1006, and a signal combiner 1008.

DSP 1002 may include any system, device, or apparatus configured to interpret and/or execute program instructions and/or process data. In some embodiments, DSP 1002 may interpret and/or execute program instructions and/or process data stored in a memory and/or other computer-readable media accessible to DSP 1002.

Amplifier 1006 may be electrically coupled to DSP 1002 (e.g., via signal combiner 1008) and may comprise any suitable electronic system, device, or apparatus configured to increase the power of an input signal $V_{IN}$ (e.g., a time-varying voltage or current) to generate an output signal $V_{OUT}$. For example, amplifier 1006 may use electric power from a power supply (not explicitly shown) to increase the amplitude of a signal. Amplifier 1006 may include any suitable amplifier class, including without limitation, a Class-D amplifier.

Signal combiner 1008 may be interfaced between DSP 1002 and amplifier 1006 and may comprise any system, device, or apparatus configured to combine a signal generated by DSP 1002 and a vibration alert signal received from a component external to integrated haptic system 112E.

In some embodiments, integrated haptic system 112E may be formed on a single integrated circuit, thus enabling lower latency than existing approaches to haptic feedback control.

In operation, DSP 1002 may be configured to receive a force signal $V_{SENSE}$ from force sensor 105 indicative of force applied to force sensor 105. In response to receipt of force signal $V_{SENSE}$ indicating a sensed force, DSP 1002 may generate an intermediate haptic playback signal $V_{INT}$. Signal combiner 1008 may receive intermediate haptic playback signal $V_{INT}$ and mix intermediate haptic playback signal $V_{INT}$ with another signal (e.g., the vibration alert signal) received by integrated haptic system 112E to generate a haptic playback signal $V_{IN}$ and communicate haptic playback signal $V_{IN}$ to amplifier 1006. Accordingly, a haptic signal generated responsive to a force (e.g., intermediate haptic playback signal $V_{INT}$) may be mixed with a further signal (e.g., the vibration alert signal), to provide a composite signal (e.g., haptic playback signal YIN) for linear resonant actuator 107. For example, the signal to generate a pure haptic feedback response may be mixed with a signal used to generate a vibratory notification or alert, for example as notification of an incoming call or message. Such mixing would allow for a user to determine that an alert has been received at the same time as feeling a haptic feedback response. As shown in FIG. 10, signal combiner 1008 may perform mixing on an input signal used as input to the amplifier 1006. However, in other embodiments, a signal combiner may perform mixing on an output signal for driving linear resonant actuator 107.

Figure 11:
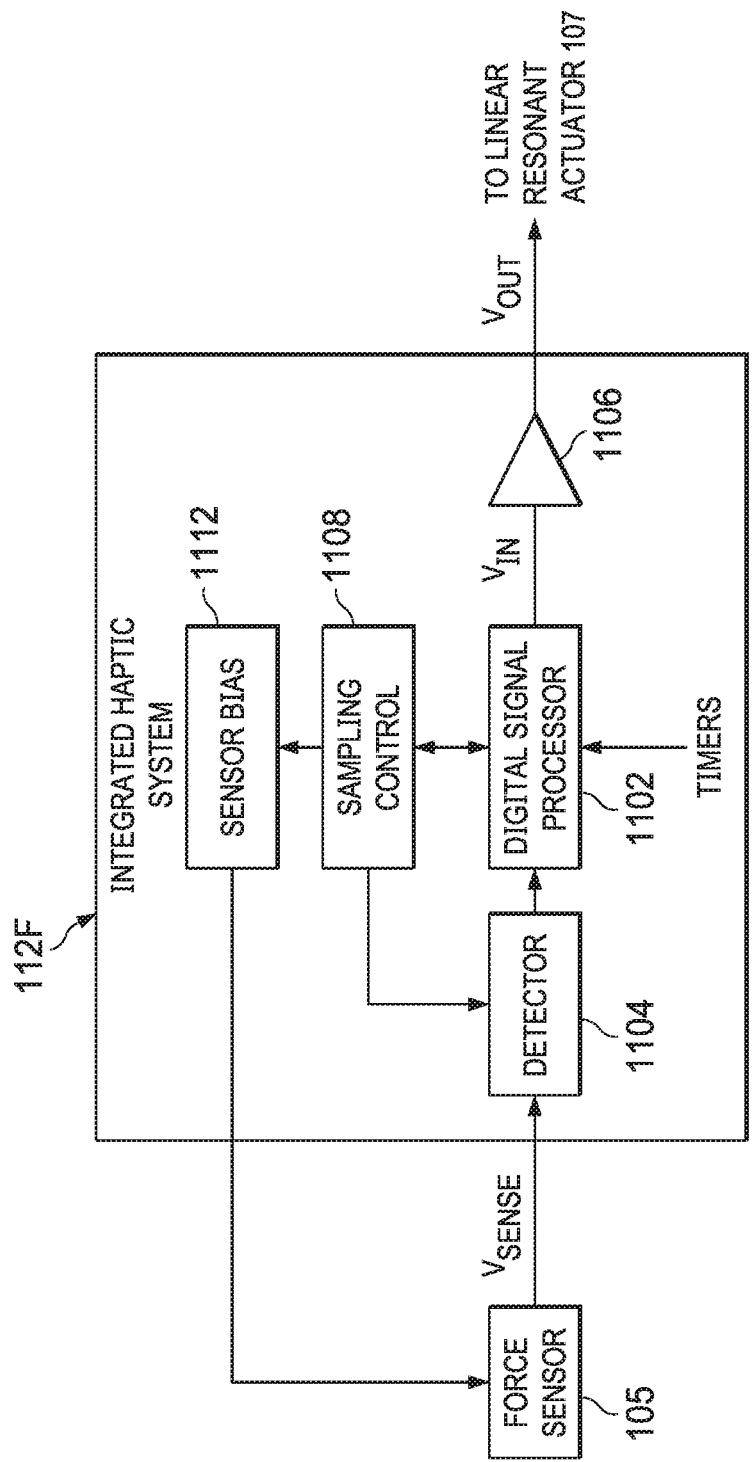
FIG. 11 illustrates a block diagram of selected components of another example integrated haptic system, in accordance with embodiments of the present disclosure.

FIG. 11 illustrates a block diagram of selected components of an example integrated haptic system 112F, in accordance with embodiments of the present disclosure.

In some embodiments, integrated haptic system 112F may be used to implement integrated haptic system 112 of FIG. 1. As shown in FIG. 11, integrated haptic system 112F may include a digital signal processor (DSP) 1102, a detector 1104, an amplifier 1106, a sampling control 1108, and a sensor bias generator 1112.

DSP 1102 may include any system, device, or apparatus configured to interpret and/or execute program instructions and/or process data. In some embodiments, DSP 1102 may interpret and/or execute program instructions and/or process data stored in a memory and/or other computer-readable media accessible to DSP 1102.

Detector 1104 may include any system, device, or apparatus configured to detect a signal (e.g., $V_{SENSE}$) indicative of a force. In some embodiments, such signal may be a signal generated by a force sensor. In other embodiments, such signal may comprise a GPIO signal indicative of a force applied to a force sensor. In some embodiments, detector 1104 may simply detect whether GPIO signal is asserted or deasserted. In other embodiments, signal $V_{SENSE}$ may indicate a magnitude of force applied and may apply logic (e.g., analog-to-digital conversion where signal $V_{SENSE}$ is analog, comparison to a threshold force level, and/or logic associated with other measurements or parameters). In any event, responsive to signal $V_{SENSE}$ indicating a requisite force, detector 1104 may communicate one or more signals to DSP 1102 indicative of signal $V_{SENSE}$. In some embodiments, all or a portion of detector 1104 may be implemented by DSP 1102.

Amplifier 1106 may be electrically coupled to DSP 1102 and may comprise any suitable electronic system, device, or apparatus configured to increase the power of an input signal $V_{IN}$ (e.g., a time-varying voltage or current) to generate an output signal $V_{OUT}$. For example, amplifier 1106 may use electric power from a power supply (not explicitly shown) to increase the amplitude of a signal. Amplifier 1106 may include any suitable amplifier class, including without limitation, a Class-D amplifier.

Sampling control 1108 may be communicatively coupled to DSP 1102 and may comprise any suitable electronic system, device, or apparatus configured to selectively enable force sensor 105 and/or components of integrated haptic system 112F, as described in greater detail below.

Sensor bias 1112 may be communicatively coupled to sampling control 1108 and may comprise any suitable electronic system, device, or apparatus configured to generate an electric bias (e.g., bias voltage or bias current) for force sensor 105, as described in greater detail below.

In some embodiments, integrated haptic system 112F may be formed on a single integrated circuit, thus enabling lower latency than existing approaches to haptic feedback control.

In operation, DSP 1102/detector 1104 may be configured to receive a force signal $V_{SENSE}$ from force sensor 105 indicative of force applied to force sensor 105. In response to receipt of force signal $V_{SENSE}$ indicating a sensed force, DSP 1102 may generate a haptic playback signal $V_{IN}$ and communicate haptic playback signal $V_{IN}$ to amplifier 1106, which is amplified by amplifier 1106 to generate output voltage $V_{OUT}$.

In addition, DSP 1102 may be configured to receive one or more timer signals (either from timing signals generated within integrated haptic system 112F or external to integrated haptic system 112F) and based thereon, generate signals to sampling control 1108. In turn, sampling control 1108 may selectively enable and disable one or more components of an input path of integrated haptic system 112F, including without limitation detector 1104, force sensor 105, a data interface of integrated haptic system 112F, a switch matrix of integrated haptic system 112F, an input amplifier of integrated haptic system 112F, and/or an analog-to-digital converter of integrated haptic system 112F. As shown in FIG. 11, sampling control 1108 may selectively enable and disable force sensor 105 by controlling an electrical bias for force sensor 105 generated by sensor bias 1112. As a result, DSP 1102 and sampling control 1108 may duty cycle durations of time in which force sensor 105, detector 1104, and/or other components of integrated haptic system 112F are active, potentially reducing power consumption of a system comprising integrated haptic system 112F.

Although the foregoing figures and descriptions thereof address integrated haptic systems 112A-112F as being representative of particular embodiments, is it understood that all or a portion of one or more of integrated haptic systems 112A-112F may be combined with all or a portion of another of integrated haptic systems 112A-112F, as suitable.

In addition, in many of the figures above, a DSP is shown generating a haptic playback signal $V_{IN}$ which may be amplified by an amplifier to generate an output voltage $V_{OUT}$. For purposes of clarity and exposition, digital-to-analog conversion of signals in the output signal path of integrated haptic systems 112A-112F have been omitted from the drawings, but it is understood that digital-to-analog converters may be present in integrated haptic systems 112A-112F to perform any necessary conversions from a digital domain to an analog domain.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An integrated haptic system comprising:
a digital signal processor configured to:
receive an input signal indicative of a force applied to a force sensor;
generate a haptic playback signal responsive to the input signal;
calculate an estimated velocity based on one or more measured electrical parameters of the vibrational actuator; and
responsive to the estimated velocity reaching a threshold velocity level or velocity peak, change a polarity of the haptic playback signal; and
an amplifier communicatively coupled to the digital signal processor, integrated with the digital signal processor into the integrated haptic system, and configured to amplify the haptic playback signal and drive a vibrational actuator communicatively coupled to the amplifier with the haptic playback signal as amplified by the amplifier.

2. The integrated haptic system of claim 1, further comprising a memory communicatively coupled to the digital signal processor, and wherein the digital signal processor is further configured to:
retrieve from the memory a haptic playback waveform; and
process the haptic playback waveform to generate the haptic playback signal.

3. The integrated haptic system of claim 2, wherein the haptic playback waveform defines a haptic response as an acceleration as a function of time.

4. The integrated haptic system of claim 3, wherein the digital signal processor generates the haptic playback signal to render haptic feedback for at least one of mechanical button replacement and capacitive sensor feedback.

5. The integrated haptic system of claim 4, wherein the digital signal processor applies an inverse transfer function to the haptic playback waveform in order to generate the haptic playback signal, wherein the inverse transfer function is an inverse of a transfer function defining a relationship between a voltage applied to the vibrational actuator and an acceleration of the vibrational actuator responsive to the voltage applied.

6. The integrated haptic system of claim 5, wherein the digital signal processor controls the haptic playback signal in a closed feedback loop whereby the digital signal processor adapts the inverse transfer function based on at least one of modeled parameters and measured parameters of the vibrational actuator.

7. The integrated haptic system of claim 2, wherein the digital signal processor applies an inverse transfer function to the haptic playback waveform in order to generate the haptic playback signal, wherein the inverse transfer function is an inverse of a transfer function defining a relationship between a voltage applied to the vibrational actuator and an acceleration of the vibrational actuator responsive to the voltage applied.

8. The integrated haptic system of claim 7, wherein the digital signal processor controls the haptic playback signal in a closed feedback loop whereby the digital signal processor adapts the inverse transfer function based on at least one of modeled parameters and measured parameters of the vibrational actuator.

9. The integrated haptic system of claim 1, wherein:
the input signal is a force sensor signal generated by the force sensor; and
the digital signal processor communicates the haptic playback signal to the amplifier in response to receipt of the force sensor signal.

10. The integrated haptic system of claim 1, wherein:
the input is a force sensor signal generated by the force sensor; and
the digital signal processor communicates the haptic playback signal to the amplifier in response to the force sensor signal exceeding a threshold.

11. The integrated haptic system of claim 1, wherein the digital signal processor generates the haptic playback signal to render haptic feedback for at least one of mechanical button replacement and capacitive sensor feedback.

12. The integrated haptic system of claim 1, wherein the digital signal processor controls the haptic playback signal in a closed feedback loop whereby the digital signal processor adapts its processing based on at least one of modeled parameters and measured parameters of the vibrational actuator.

13. The integrated haptic system of claim 1, wherein measured electrical parameters comprise one or more of a voltage and a current.

14. The integrated haptic system of claim 1, wherein the digital signal processor is further configured to:
monitor one or more diagnostic inputs indicative of a status of the vibrational actuator; and
control at least one of operation of the amplifier and the haptic playback signal responsive to monitoring of the one or more diagnostic inputs.

15. The integrated haptic system of claim 14, wherein the one or more diagnostic inputs are indicative of one or more of a current, a voltage, and an inductance of the vibrational actuator.

16. The integrated haptic system of claim 14, wherein the digital signal processor is further configured to:
determine a displacement of the vibrational actuator based on the one or more diagnostic inputs; and
control the haptic playback signal to prevent the vibrational actuator from exceeding a displacement limit.

17. The integrated haptic system of claim 14, wherein the digital signal processor is further configured to:
determine operational drift of the vibrational actuator based on the one or more diagnostic inputs; and
control the haptic playback signal to account for the operational drift.

18. The integrated haptic system of claim 14, wherein the digital signal processor is further configured to:
   determine temperature effects of the vibrational actuator based on the one or more diagnostic inputs; and
   control the haptic playback signal to account for the temperature effects.

19. The integrated haptic system of claim 1, further comprising an applications processor interface interfaced between the digital signal processor and an applications processor external to the integrated haptic system, wherein the digital signal processor is further configured to communicate an activity notification to the applications processor via the applications processor interface responsive to the force.

20. The integrated haptic system of claim 1, further comprising an applications processor interface interfaced between the digital signal processor and an applications processor external to the integrated haptic system, wherein the digital signal processor is further configured to:
   receive communications from the applications processor via the applications processor interface; and
   modify the haptic playback signal responsive to the communications.

21. The integrated haptic system of claim 1, wherein the integrated haptic system is further configured to mix an intermediate haptic playback signal generated by the digital signal processor with another signal received by the integrated haptic system to generate the haptic playback signal.

22. The integrated haptic system of claim 1, wherein the digital signal processor is further configured to selectively enable and disable the amplifier based on the input signal.

23. The integrated haptic system of claim 1, wherein the integrated haptic system is integral to one of a mobile phone, personal digital assistant, and game controller.

24. The integrated haptic system of claim 1, further comprising a sampling controller communicatively coupled to the digital signal processor and configured to generate a duty-cycling signal to duty-cycle the force sensor in order to reduce an active duration of the force sensor.

25. The integrated haptic system of claim 24, wherein:
   the input signal is a force sensor signal generated by the force sensor; and
   the integrated haptic system further comprises an input path arranged to communicate the force sensor signal to the digital signal processor, and wherein the sampling controller is further configured to generate a second duty-cycling signal to duty-cycle to one or more components of the input path to reduce an active duration of the input path.

26. The integrated haptic system of claim 25, wherein the one or more components comprise one or more of a detector, a data interface, a switch matrix, an input path amplifier, and an analog-to-digital converter.

27. The integrated haptic system of claim 1, wherein the digital signal processor and the amplifier are formed on and integral to a single integrated circuit.

28. An integrated haptic system comprising:
   a digital signal processor configured to:
      receive an input signal indicative of a force applied to a force sensor;
      generate a haptic playback signal responsive to the input signal; and
      change a polarity of the haptic playback signal responsive to a passage of a time equal to an inverse of a frequency at which a maximum clipping-free acceleration level is obtainable; and
   an amplifier communicatively coupled to the digital signal processor, integrated with the digital signal processor into the integrated haptic system, and configured to amplify the haptic playback signal and drive a vibrational actuator communicatively coupled to the amplifier with the haptic playback signal as amplified by the amplifier.

29. A method comprising:
   receiving, by a digital signal processor, an input signal indicative of a force applied to a force sensor;
   generating, by the digital signal processor, a haptic playback signal responsive to the input signal;
   calculating, by the digital signal processor, estimated velocity based on one or more measured electrical parameters of a vibrational actuator;
   changing a polarity of the haptic playback signal responsive to the estimated velocity reaching a threshold velocity level or velocity peak; and
   driving, with an amplifier communicatively coupled to the digital signal processor and integrated with the digital signal processor into an integrated haptic system, the haptic playback signal as amplified by the amplifier.

30. The method of claim 29, further comprising:
   retrieving, by the digital signal processor from a memory communicatively coupled to the digital signal processor, a haptic playback waveform; and
   processing, by the digital signal processor, the haptic playback waveform to generate the haptic playback signal.

31. The method of claim 30, wherein the haptic playback waveform defines a haptic response as an acceleration as a function of time.

32. The method of claim 31, wherein the digital signal processor generates the haptic playback signal to render haptic feedback for at least one of mechanical button replacement and capacitive sensor feedback.

33. The method of claim 32, further comprising applying, by the digital signal processor, an inverse transfer function to the haptic playback waveform in order to generate the haptic playback signal, wherein the inverse transfer function is an inverse of a transfer function defining a relationship between a voltage applied to a vibrational actuator and an acceleration of the vibrational actuator responsive to the voltage applied.

34. The method of claim 33, further comprising controlling, by the digital signal processor, the haptic playback signal in a closed feedback loop whereby the digital signal processor adapts the inverse transfer function based on at least one of modeled parameters and measured parameters of the vibrational actuator.

35. The method of claim 34, further comprising applying, by the digital signal processor, the inverse transfer function to the haptic playback waveform in order to generate the haptic playback signal, wherein the inverse transfer function is an inverse of a transfer function defining a relationship between a voltage applied to the vibrational actuator and an acceleration of the vibrational actuator responsive to the voltage applied.

36. The method of claim 35, further comprising controlling, by the digital signal processor, the haptic playback signal in a closed feedback loop whereby the digital signal processor adapts the inverse transfer function based on at least one of modeled parameters and measured parameters of the vibrational actuator.

37. The method of claim 29, wherein:
   the input signal is a force sensor signal generated by the force sensor; and the method further comprises communicating, by the digital signal processor, the haptic playback signal to the amplifier in response to receipt of the force sensor signal.

38. The method of claim 29, wherein:
the input signal is a force sensor signal generated by the force sensor; and
the method further comprises communicating, by the digital signal processor, the haptic playback signal to the amplifier in response to the force sensor signal exceeding a threshold.

39. The method of claim 29, wherein the digital signal processor generates the haptic playback signal to render haptic feedback for at least one of mechanical button replacement and capacitive sensor feedback.

40. The method of claim 29, further comprising controlling, by the digital signal processor, the haptic playback signal in a closed feedback loop whereby the digital signal processor adapts its processing based on at least one of modeled parameters and measured parameters of a vibrational actuator.

41. The method of claim 29, wherein measured electrical parameters comprise one or more of a voltage and a current.

42. The method of claim 29, further comprising, by the digital signal processor:
monitoring one or more diagnostic inputs indicative of a status of a vibrational actuator; and
controlling at least one of operation of the amplifier and the haptic playback signal responsive to monitoring of the one or more diagnostic inputs.

43. The method of claim 42, wherein the one or more diagnostic inputs are indicative of one or more of a current, a voltage, and an inductance of the vibrational actuator.

44. The method of claim 42, further comprising, by the digital signal processor:
determining a displacement of the vibrational actuator based on the one or more diagnostic inputs; and
controlling the haptic playback signal to prevent the vibrational actuator from exceeding a displacement limit.

45. The method of claim 42, further comprising, by the digital signal processor:
determining operational drift of the vibrational actuator based on the one or more diagnostic inputs; and
controlling the haptic playback signal to account for the operational drift.

46. The method of claim 42, further comprising, by the digital signal processor:
determining temperature effects of the vibrational actuator based on the one or more diagnostic inputs; and
controlling the haptic playback signal to account for the temperature effects.

47. The method of claim 29, further comprising communicating, by the digital signal processor, an activity notification to an applications processor external to the integrated haptic system via an applications processor interface responsive to the force, wherein the applications processor interface is interfaced between the digital signal processor and the applications processor.

48. The method of claim 29, further comprising, by the digital signal processor:
receiving communications from an applications processor external to the integrated haptic system via an applications processor interface, wherein the applications processor interface is interfaced between the digital signal processor and the applications processor; and
modifying the haptic playback signal responsive to the communications.

49. The method of claim 29, further comprising mixing an intermediate haptic playback signal generated by the digital signal processor with another signal received by the integrated haptic system to generate the haptic playback signal.

50. The method of claim 29, further comprising selectively enabling and disabling the amplifier based on the input signal.

51. The method of claim 29, further comprising generating a duty-cycling signal to duty-cycle the force sensor in order to reduce an active duration of the force sensor.

52. The method of claim 51, wherein:
the input signal is a force sensor signal generated by the force sensor; and
the method further comprises generating a second duty-cycling signal to duty-cycle to one or more components of an input path of the integrated haptic system to reduce an active duration of the input path, wherein the input path is arranged to communicate the force sensor signal to the digital signal processor.

53. The method of claim 52, wherein the one or more components comprise one or more of a detector, a data interface, a switch matrix, an input path amplifier, and an analog-to-digital converter.

54. The method of claim 29, wherein the digital signal processor and the amplifier are formed on and integral to a single integrated circuit.

55. A method comprising:
receiving, by a digital signal processor, an input signal indicative of a force applied to a force sensor;
generating, by the digital signal processor, a haptic playback signal responsive to the input signal;
changing a polarity of the haptic playback signal responsive to a passage of a time equal to an inverse of a frequency at which a maximum clipping-free acceleration level is obtainable; and
driving, with an amplifier communicatively coupled to the digital signal processor and integrated with the digital signal processor into an integrated haptic system, the haptic playback signal as amplified by the amplifier.

56. An article of manufacture comprising:
a non-transitory computer-readable medium; and
computer-executable instructions carried on the computer-readable medium, the instructions readable by a processor, the instructions, when read and executed, for causing the processor to:
receive an input signal indicative of a force applied to a force sensor;
generate a haptic playback signal responsive to the input signal, such that an amplifier communicatively coupled to the processor and integrated with the digital signal processor into an integrated haptic system, amplifies and drives the haptic playback signal;
calculate estimated velocity based on one or more measured electrical parameters of a vibrational actuator; and
change the polarity of the haptic playback signal responsive to the estimated velocity reaching a threshold velocity level or velocity peak.

57. An article of manufacture comprising:
a non-transitory computer-readable medium; and
computer-executable instructions carried on the computer-readable medium, the instructions readable by a processor, the instructions, when read and executed, for causing the processor to:

receive an input signal indicative of a force applied to a force sensor;

generate a haptic playback signal responsive to the input signal, such that an amplifier communicatively coupled to the processor and integrated with the digital signal processor into an integrated haptic system, amplifies and drives the haptic playback signal;

changing a polarity of the haptic playback signal responsive to a passage of a time equal to an inverse of a frequency at which a maximum clipping-free acceleration level is obtainable.

* * * * *